United States Patent [19]

Läuffer

[11] 3,838,347

[45] Sept. 24, 1974

[54] APPARATUS FOR TRANSFORMING A DETERIORATED INPUT SIGNAL INTO A BINARY SIGNAL

[75] Inventor: Hermann Läuffer, Hombrechtikon, Switzerland

[73] Assignee: Zellweger AG, Uster, Switzerland

[22] Filed: Jan. 27, 1972

[21] Appl. No.: 221,241

[30] Foreign Application Priority Data

Mar. 24, 1971 Switzerland........................ 4407/71

[52] U.S. Cl............ 328/164, 235/61.11 R, 307/268

[51] Int. Cl............................................. H03k 5/08

[58] Field of Search........... 235/61.11; 340/146.3 C, 340/347 AD, 347 DD, 174.1 H, 174.1 A; 328/162, 164; 178/69, 88; 307/268

[56] References Cited

UNITED STATES PATENTS 3,541,508 11/1970 Vaccaro...................... 340/146.3 C

FOREIGN PATENTS OR APPLICATIONS 612,371 1948 Great Britain...................... 328/164

OTHER PUBLICATIONS

Hoeschele, "Analog-to-Digital ---," 8/1968, J. Wiley & Sons, pp. 231–239.

*Primary Examiner*—Thomas J. Sloyan
*Attorney, Agent, or Firm*—Werner W. Kleeman

[57] ABSTRACT

A method of, and apparatus for, converting an analogue signal into a binary signal wherein the analogue signal is differentiated as a function of time, and a second analogue signal which is proportional to the derivative or first differential quotient as a function of time of the first analogue signal is formed from the differentiated signal. The second analogue signal is compared both with a positive as well as with a negative threshold value, and during the time of exceeding the positive threshold value until exceeding the negative threshold value there is formed a first type of binary signal and during the remaining time a second type of binary signal. If desired, the first and second analogue signals may be amplified.

8 Claims, 8 Drawing Figures

APPARATUS FOR TRANSFORMING A DETERIORATED INPUT SIGNAL INTO A BINARY SIGNAL

BACKGROUND OF THE INVENTION

The present invention relates to a new and improved method of, and apparatus for, converting an analogue or deteriorated digital signal into a binary signal as well as to use of the aforesaid inventive method.

Binary signals are particularly suitable for processing information characterized by electrical signals. However, in many instances, the information is initially expressed by an analogue signal. Then it is necessary to convert this analogue signal into binary form. To this end, the prior art has devised analogue-binary converters.

With state-of-the-art analogue-binary converters, transformation of the analogue signal into binary form is carried out with the aid of one or a number of threshold value devices, to the input of which there is delivered the analogue signal and at the output of which there is connected one or a number of flip-flops. Upon exceeding or falling below a prescribed threshold value, these flip-flop circuits are triggered and at the output thereof there appears a sequence of pulses and pulse gaps or intervals as a function of the course of the analogue input signal. In many instances, such prior art analogue-binary converters operate satisfactorily. But in other cases, especially when at the input signal of the analogue-binary converter there appears, apart from the useful signal a disturbance signal which can not be neglected, then operation of the aforementioned analogue-binary converter becomes questionable, since the disturbance signal also produces pulses and pulse intervals at the output signal.

SUMMARY OF THE INVENTION

Accordingly, from what has been stated above, it will be recognized that the art is still in need of an improved method of, and apparatus for, transforming an analogue signal into a binary signal which is not associated with the aforementioned drawbacks and limitations of the state-of-the-art techniques and equipment. Hence, a primary objective of the present invention is directed to the provision of a new and improved method of, and apparatus for, the conversion of analogue signals into binary signals in a manner which effectively and reliably fulfills the existing need in the art and is not associated with the aforementioned drawbacks and limitations of the prior art.

Still a further significant object of the present invention relates to a method of converting an analogue signal into a binary signal in a manner wherein at least certain disturbance signals do not have any disadvantageous affect upon the output signal.

Yet a further object of this invention is to provide a new and improved construction of apparatus suitable for the performance of the inventive method.

And a still further noteworthy object of this invention relates to a novel construction of appratus for the transformation of an analogue signal into a binary signal in an extremely satisfactory and reliable manner, the apparatus construction being manifested by its extreme reliability and integrity in operation, relative simplicity in design and construction, and economies in circuit manufacture and design.

In this specification, the expressions "analogue signal" and "deteriorated input signal" are meant to refer to the same signal.

Now, in order to implement these and still further objects of the invention, which will become more readily apparent as the description proceeds, the inventive method for the conversion of an analogue signal into a binary signal contemplates differentiating the analogue signal as a function of time, the differentiation step if desired can be carried out following amplification of such analogue signal. Owing to such differentiation, a second analogue signal is formed which is proportional to the derivative or first differential quotient as a function of the time of the first analogue signal. The second analogue signal, and if desired again after amplification, can be compared with both a positive as well as also a negative threshold value. From the time of exceeding the positive threshold value until exceeding the negative threshold value a first type of binary signal is formed and in the remaining time there is formed a second type of binary signal.

Not only is the invention concerned with the aforementioned method aspects, but as discussed above, it also relates to apparatus for carrying out such method and specifically for the conversion of an analogue signal into a binary signal. The inventive apparatus is manifested by the features that there is provided a differentiator for forming a second analogue signal from an analogue signal delivered thereto, the second analogue signal being proportional to the derivative or first differential quotient as a function of the time of the first analogue signal. Arranged following the differentiator is a threshold value device which compares the aforementioned second analogue signal with a positive and a negative threshold value and during the time of exceeding the positive threshold value until exceeding the negative threshold value delivers a first type of binary signal and in the remaining time delivers a second type of binary signal.

Apart from the foregoing, the invention is also concerned with the use of the previously mentioned method aspects for the conversion of an analogue output signal of a reading mechanism, especially for reading-out optically discernible characters at various type articles, into a binary signal. A reader with which the invention can be employed, for instance, has been disclosed in the copending commonly assigned application, Serial No. 221,702, filed Jan. 28, 1972, and entitled "Reading Apparatus for Optically Discernible Characters."

Purely by way of illustration, the invention will be described in conjunction with the drawings on the basis of the use of the inventive embodiment with a code reader. Still it should be understood that the invention is described in this environment purely by way of illustration and is not intended to be limited thereto.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figures 1, 2, 3, 4, 8:
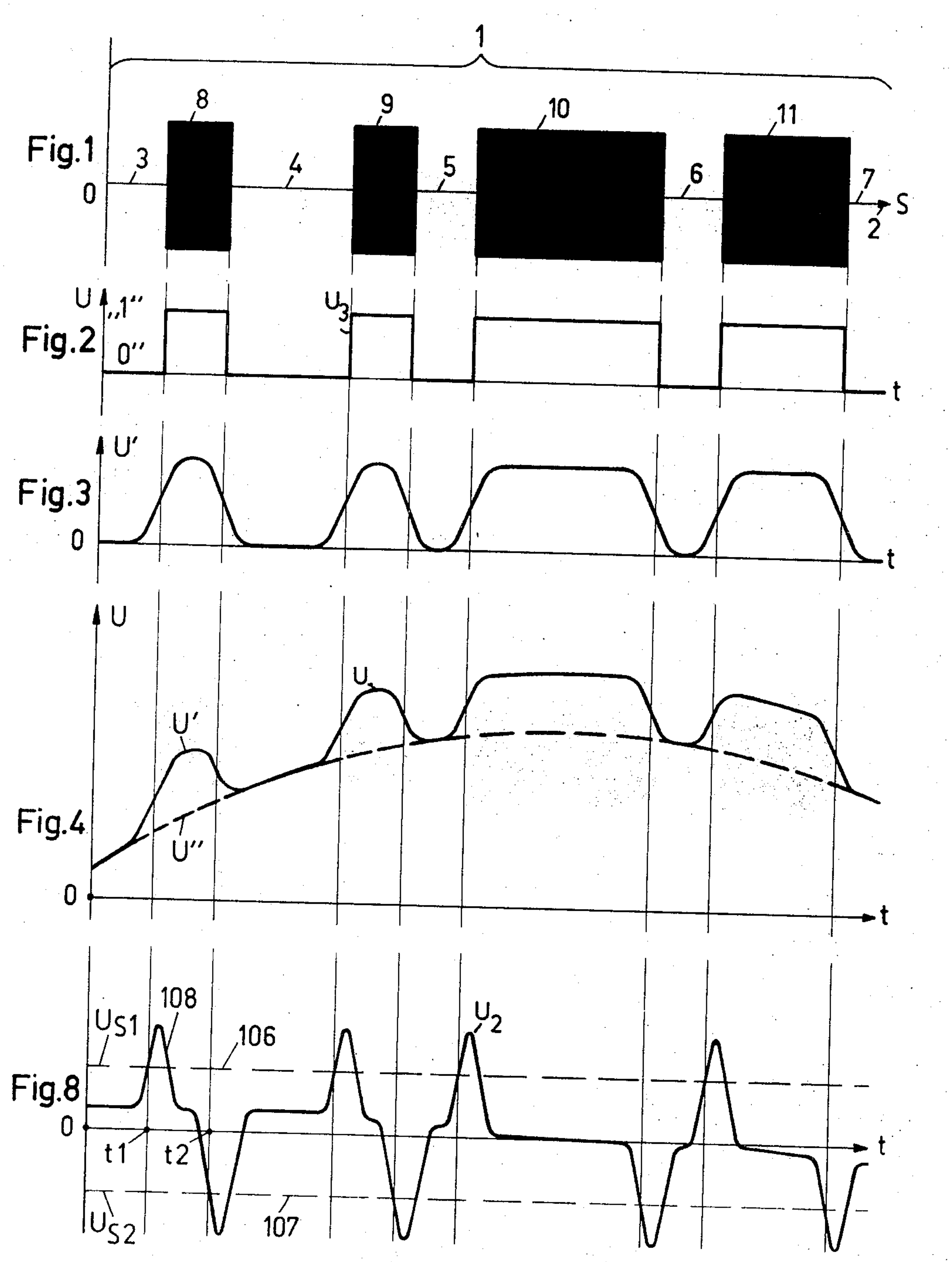
FIG. 1 is a simplified graphic representation of a code character.
FIG. 2 is a graphic portrayal of a binary signal which is desired following the scanning or reading of the code character depicted in FIG. 1.
FIG. 3 graphically represents an analogue output signal of a code reader.
FIG. 4 is a graphic representation of the output signal of a code reader at the time that there is present a distrubance voltage.
FIG. 8 is a graphic representation of the course of a second analogue signal.

Describing now the drawings, in FIG. 1 there is illustrated a graph of a simple binary code character 1. It consists of a black bar waveform pattern impressed upon a white background. Binary characters of a first type are indicated by the white locations and binary characters of a second type by the black bar locations. Thus, for instance, binary characters of the first type could possess the value "0" and binary characters of the second type the value "1", or vice versa. A scanning trace 2 of a scanning light beam guided over the code character 1 moves transversely across the code character 1 along the scanning path S. At the white locations 3, 4, 5, 6 and 7 a great deal of light is reflected, at the black locations 8, 9, 10 and 11 no or only very little light is reflected. In a manner well known in the electronics art, the reflected light can be converted at standard photoelectric transducers into an analogue electrical signal which is at least proportional to the intensity of the reflected light.

Now owing to certain imperfections in the technology in this art, both with regard to the code character itself and also as concerns the scanning technique, scanning of the code character 1 does not directly produce a binary signal having the course or signal envelope of FIG. 2 as such would otherwise be desired. In a favorable situation, there could be expected an output signal U' of the photoelectric transducer having the envelope shape or course approximately portrayed in FIG. 3. An output signal of the type depicted in FIG. 3 can be, however, converted without difficulty with prior art equipment into a signal of the type shown in FIG. 2. In many situations, especially when scanning optically discernible characters, pronounced disturbance signals can arise in proportion to the magnitude of the useful signal. In this connection attention is invited to FIG. 3. The course as a function of time of a signal which has been disturbed this way has been represented in FIG. 4. The output signal U therefore is composed of the useful signal U' and the disturbance signal U''.

Accurate observation or analysis of output signals which are obtained in practice, for instance during photoelectric readout of code characters, has shown that in the aforementioned situations where there is simultaneous occurrence of useful signals and disturbance signals, the course of the derivative or first differential quotient of the useful signal differs in a characteristic manner from the course of the derivative or first differential quotient of the disturbance signal. In particular, the useful signal U' at the 0/1 or 1/0 transition locations of the code character 1 exhibits a relatively great flank steepness, whereas the disturbance signal U'', notwithstanding its large amplitude, exhibits a considerably smaller flank steepness. Hence, the present invention is based upon the concept of differentiating as a function of time in a differentiator the output voltage or signal of the photoelectric transducer and thereafter only employing such output voltages or signals of the differentiator for the purpose of forming a pulse sequence which output voltages or signals exceed a predetermined value of the differential quotient.

However, it is also possible that apart from the useful signal, there arise disturbance signals possessing sporadic voltage peaks. Such voltage peaks can not be suppressed by the aforementioned differentiation. Hence they could produce erroneous pulse sequences. Accordingly, according to a further advantageous physical manifestation of the invention, the analogue signal, prior to or following differentiation, is thus conducted through a low-pass filter having a predetermined boundary frequency. This boundary frequency is advantageously selected to be only just so great that signals with the greatest flank steepness are still just located in the throughpass region of the filter, as such signals can be expected with the 0/1 and 1/0 transition of the useful signal.

The time-constant of the differentiator determines the minimum flank steepness which must be exceeded by the input signal in order to attain a differentiated output signal of predetermined magnitude. On the other hand, by virtue of the throughpass characteristics of the low-pass filter, the magnitude of the output signal with increasing flank steepness is limited.

The circuit configuration of a series connected differentiator and low-pass filter followed by a threshold value circuit thus permits the extensive suppression of input signals having a flank steepness which is too small or too large. Those skilled in the electronics art will be readily able to select, for a given situation, the circuit dimensions such that practically only such signals will be able to be passed through the apparatus, whose flank steepness is located within a prescribed range. If the invention is employed for the evaluation of an output signal (FIG. 4) produced by a photoelectric transducer during the scanning of a code character 1 (FIG. 1), then the technical data or parameters of the scanning system, such as scanning velocity, diameter of the scanning light spot, structure of the code character and so forth, will determine the minimum and maximum flank steepness of the useful signal. From these parameters those versed in the art will readily be able to determine the proper dimensioning of the differentiator, the low-pass filter and the threshold value of the threshold value device.

Figure 5:
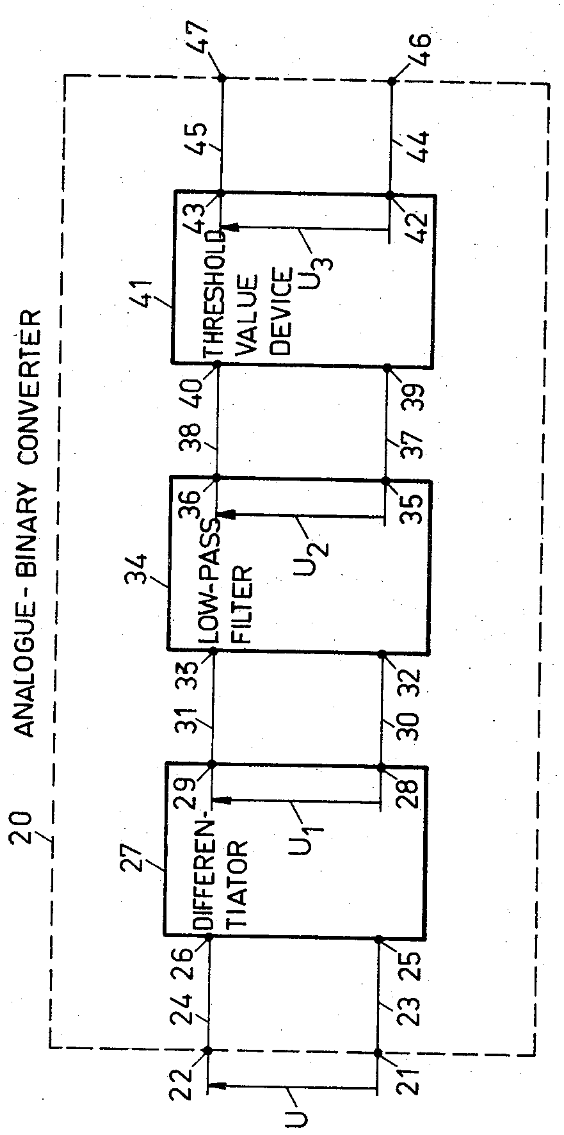
FIG. 5 is a block circuit diagram of an exemplary embodiment of the invention.

Now with the foregoing background in mind and considering the block circuit diagram depicted in FIG. 5 of an exemplary embodiment of the invention, it will be seen that an analogue-binary converter 20, also referred to as an analogue-digital converter, has the input terminals 21 and 22. The analogue signal U (FIG. 4) which is to be transformed is applied to the input terminals 21 and 22. This signal U is delivered via the conductors 23 and 24 to the input terminals 25 and 26 of a differentiator 27. Between the output terminals 28 and 29 of the differentiator 27 there appears a signal $U_1$ which is proportional to the first differential quotient as a function of time or first time derivative of the signal U. This output signal $U_1$ of the differentiator 27 is delivered via the conductors 30 and 31 to the input terminals 32 and 33 of a low-pass filter 34. Between the output terminals 35 and 36 of the low-pass filter 34 there appears an output signal $U_2$. At this signal $U_2$ there are no longer present disturbance signals whose flank steepness is above the region or range determined by the boundary frequency of the low-pass filter 34. The output signal $U_2$ of the low-pass filter 34 is delivered via the conductors 37 and 38 to the input terminals 39 and 40 of a threshold value device 41. Between the output terminals 42 and 43 of the threshold value device 41 there appears an output signal $U_3$, the course of which corresponds to the showing of FIG. 2. The output signal $U_3$ of the threshold value device 41 is delivered via the conductors 44 and 45 to the output terminals 46 and 47 of the analogue-binary converter 20. The output signal $U_3$ is of the form of a sequence of square wave or rectangular pulses, the flanks of which at least approximately coincide with the flanks of the useful signal of the input signal U.

Figure 6:
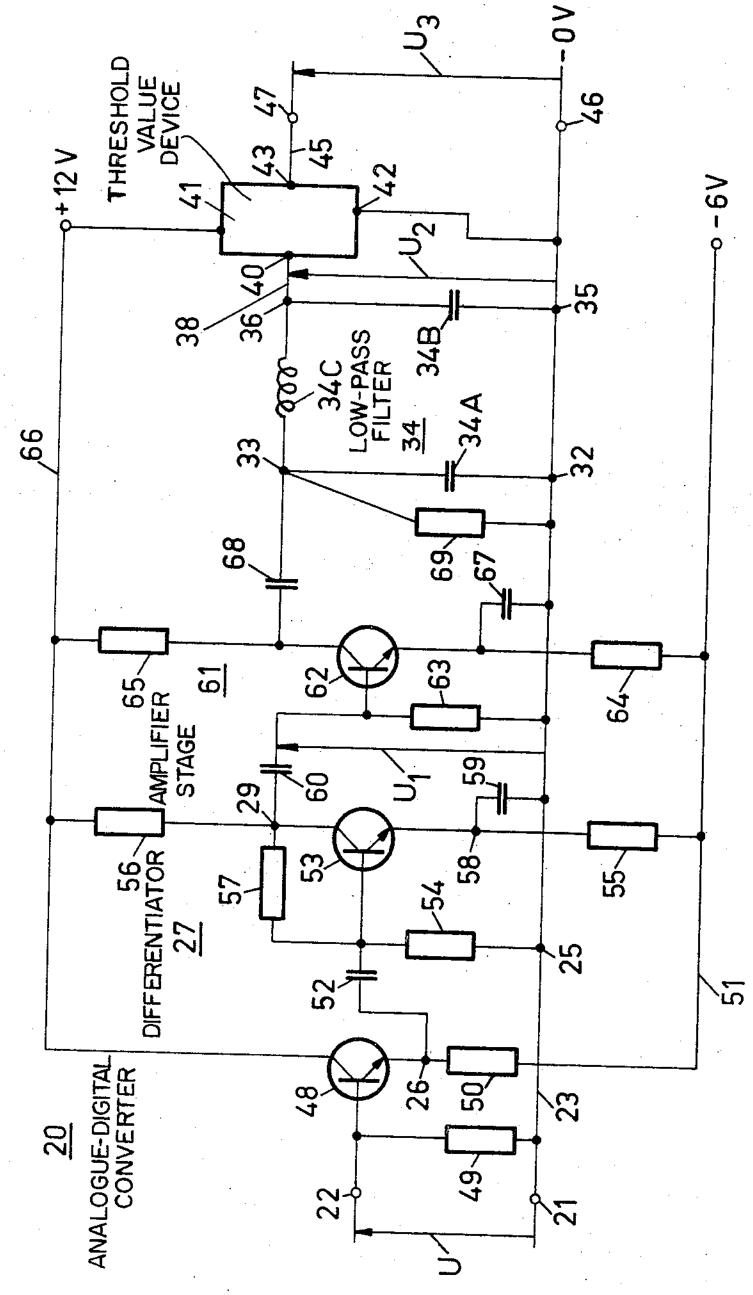
FIG. 6 is a detailed circuit diagram of a further embodiment of the invention.

Now FIG. 6 illustrates a detailed circuit diagram of a further embodiment of this invention. For purposes of simplification and to the extent that the same circuit locations are present in FIG. 6 which correspond with those of FIG. 5 it will be understood that the same reference characters have been conveniently employed. In this case the analogue input signal U is applied between the input terminals 21 and 22. An emitter-follower stage with a transistor 48 serves as an impedance converter between the preferably high-ohm input of the analogue-binary converter 20 and the low-ohm input of the differentiator 27. The base of the transistor 48 is coupled via a resistor 49 with the conductor 23 which is at null potential, whereas the emitter of the transistor 48 is connected via a resistor 50 with a conductor 51 having applied thereto −6 volts, as shown. The emitter connection of the transistor 48 constitutes the input terminal 26 of the differentiator 27.

The differentiator 27 comprises a capacitor 52, following which there is connected the input of a feedback amplifier stage containing a transistor 53, a base resistor 54, an emitter resistor 55, a collector resistor 56, and a feedback resistor 57. The emitter connection 58 of the transistor 53 is connected via a capacitor 59 with the conductor 23 which is at null potential. The collector connection of the transistor 53 constitutes the output terminal 29 of the differentiator 27. By means of a coupling capacitor 60, an amplifier stage 61 is connected following the differentiator 27. The amplifier stage 61 contains a transistor 62, the base of which is connected via a resistor 63 with the null potential conductor 23. The emitter of the transistor 62 is connected via a resistor 64 with the conductor 51 which has applied thereto −6 volts. By means of a resistor 65 the collector of the transistor 62 is connected with a conductor 66 at which there is applied +12 volts. The emitter of the transistor 62 is additionally coupled via a capacitor 67 with the conductor 23 which is at null potential. The collector terminal or connection of the transistor 62 is coupled through the agency of a further coupling capacitor 68 with the input terminal 33 of the low-pass filter 34. In the embodiment under consideration, the low-pass filter 34 consists of an input capacitor 34A, an output capacitor 34B, as well as an inductance 34C by means of which the input terminal 33 is galvanically connected with the output terminal 36. Now in order to provide a defined rest potential for the output terminal 36 of the low-pass filter 34 the input terminal 33 is connected via a resistor 69 with the conductor 23 which is at null potential.

The ascending and descending flanks at the input signal U (FIG. 4) to the analogue-binary converter and which appear during scanning of the code character 1 (FIG. 1) produce at the output terminal 36 of the low-pass filter 34 positive and negative pulses. These pulses are delivered via the conductor 38 to the input terminal 40 of the threshold value device or mechanism 41. The threshold value device 41 has the function, during scanning of white and black portions of the code character 1, to produce a pulse sequence of the type shown in FIG. 2 from the positive and negative pulses delivered thereto.

Figure 7:
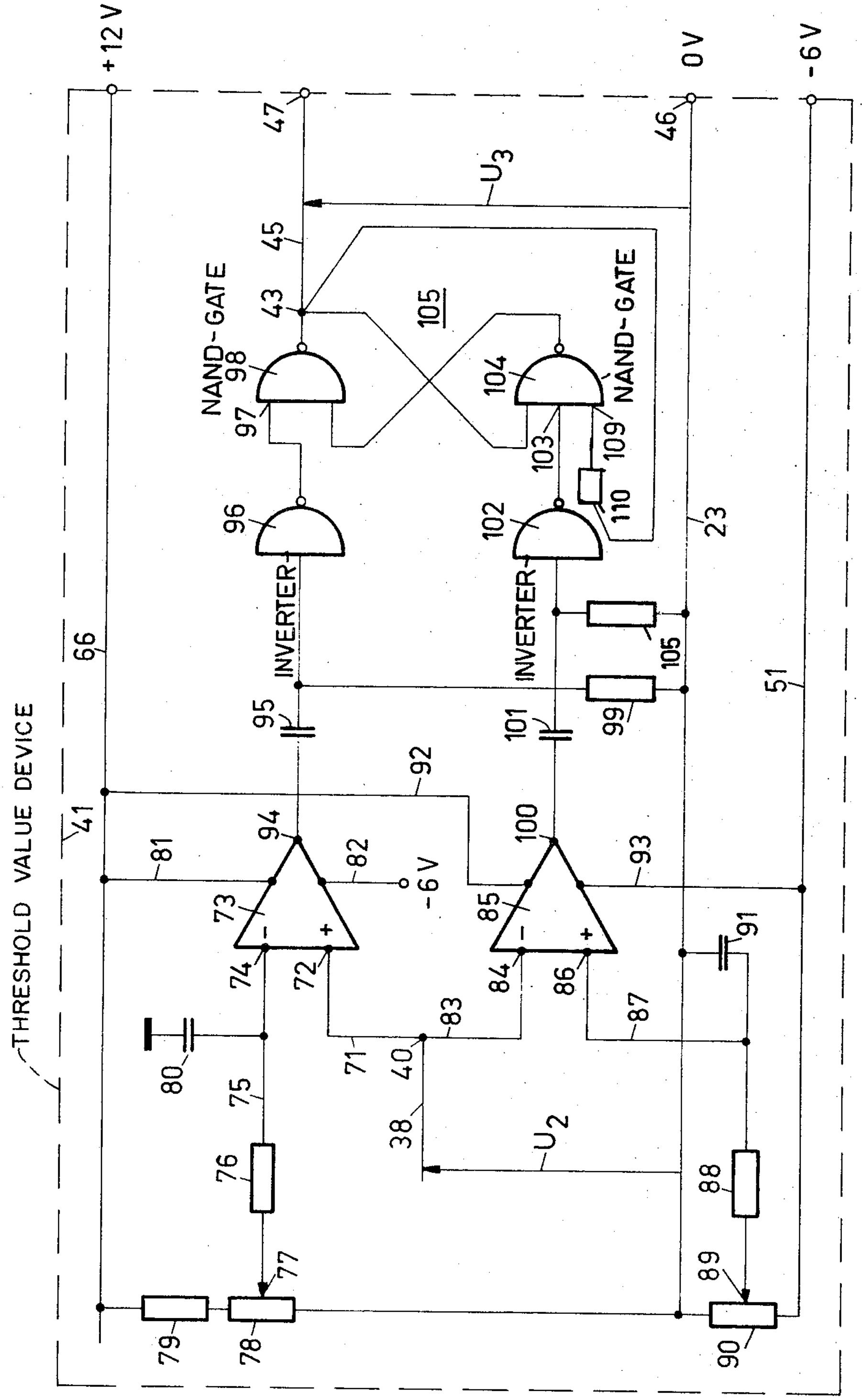
FIG. 7 is a circuit diagram of a threshold value device.

The construction and mode of operation of an exemplary embodiment of threshold value device 41 suitable for the purposes of this invention will now be discussed in conjunction with the circuit diagram of FIG. 7. The positions corresponding in FIG. 7 to those of the remaining figures have been conveniently designated with the same reference characters. Now the conductor 38 serves to couple the input terminal 40 of the threshold value device 41 with the output terminal 36 of the low-pass filter 34. The input terminal 40 is connected via a conductor 71 with a first input 72 of a differential amplifier 73 functioning as a voltage comparator. The other input 74 of the amplifier 73 is connected via a conductor 75 and a resistor 76 with the sliding tap 77 of a potentiometer 78. This potentiometer 78 is connected on the one hand through the agency of a resistor 79 with the conductor 66 carrying +12 volts, and on the other hand with the conductor 23 carrying zero volts. A capacitor 80 located between the other input 74 and ground serves to block disturbance voltages from reaching the amplifier input 74. The differential amplifier 73 is connected via the conductors 81 and 82 with +12 volts and −6 volts respectively.

The response threshold value of the amplifier 73 can be regulated by means of the sliding tap 77 of the potentiometer 78. The mode of connection of the amplifier 73 is selected such that the threshold value provided for the amplifier 73 possesses positive polarity.

In corresponding manner, the input terminal 40 is connected via a conductor 83 with a first input 84 of a further differential amplifier 85 functioning as a voltage comparator. The other input 86 of the amplifier 85 is connected via a conductor 87 and a resistor 88 with the sliding tap 89 of a potentiometer 90. This potentiometer 90 is located between the conductor 51 which carries −6 volts and the conductor 23 carrying null potential. A capacitor 91 located between the other input 86 and ground, blocks disturbance voltages from reaching the amplifier input 86. The differential amplifier 85 is coupled via the conductors 92 and 93 with +12 volts and −6 volts respectively. The response threshold value of the amplifier 85 can be regulated by means of the sliding tap 89 of the potentiometer 90. The mode of connection of the amplifier 85 is selected such that the threshold value which is provided for such amplifier 85 possesses negative polarity.

Hence, differential amplifier 73 therefore serves for processing positively directed pulses and the differential amplifier 85 for the processing of negatively directed pulses of the signal $U_2$.

The output 94 of the amplifier 73 is connected via a capacitor 95 and an inverter 96 with an input 97 of a NAND-gate 98. The input of the inverter 96 is connected via a resistor 99 with the null potential conductor 23. The output 100 of the amplifier 85 is connected via a capacitor 101 and an inverter 102 with the input 103 of a further NAND-gate 104. The input of the inverter 102 is coupled via a resistor 105 with the null potential conductor 23.

Both of the NAND-gates 98 and 104 are connected together in conventional manner to form a flip-flop 105, the output 43 of which is coupled via a conductor 45 with the output terminal 47 of the analogue-binary converter 20. The terminal 46 which is at null potential forms the other output terminal of such analogue-binary converter.

The signal $U_2$ which is delivered to the input terminal 40 of the threshold value device 41 possesses, for instance, a signal course or envelope as shown in FIG. 8. In FIG. 8, the threshold value $U_{S1}$ of the amplifier 73 is indicated by the phantom or interrupted line 106, and the threshold value $U_{S2}$ of the amplifier 85 is also indicated in FIG. 8 in the form of the phantom or interrupted line 107. The time-course of the voltage $U_2$ is represented by the curve 108. Along the time-axis or abscissa $t$ reference character $t_1$ indicates the point in time when during the first ascending flank of the signal U (FIG. 4), the signal $U_2$ exceeds the first threshold value $U_{S1}$. Owing to this exceeding of the first threshold value $U_{S1}$ at the amplifier 73, the voltage appearing at its output 94 drops from an original positive value, of for instance 12 volts to 0 volts. The thus occurring negatively directed pulse, inverted at the inverter 96, brings about switching of the flip-flop 105. The flip-flop 105 remains in the now assumed position until reaching the time $t_2$, at which point, following the first descending flank at the signal U (FIG. 4) of the signal $U_2$, there is exceeded in the negative direction the second threshold value $U_{S2}$ of the amplifier 85. Due to exceeding such threshold value, the previously positive voltage at the output 100 of the amplifier 85 drops to zero. The thus occurring negatively directed pulse, inverted at the inverter 102, causes switching back of the flip-flop 105.

In both of the switched conditions of the flip-flop 105, its output 43 alternately assumes the logic signal values 1 and 0, respectively, for instance +3 and +0.2 volts respectively.

Since the flip-flop 105 inherently does not possess any defined rest position, it is advantageous, by applying a control pulse at a further input 109 of the flip-flop 105 i.e., the NAND-gate 104 to bring about a preferred rest position of flip-flop 105. Such control pulse can be delivered from a conventional timing element or timer 110 placed into operation by the output signal appearing at the output 43 of the flip-flop 105. This timing element 110 is for instance adjusted such that after a predetermined time-span following the last occurrence of the logical signal value 1 at the output 43 of the flip-flop 105, there appears the control pulse which switches back such flip-flop 105.

Suitable as the differential amplifiers 73 and 85 there can be employed, for instance, those commercially available under the code designation Type LM710 of National Semiconductor Corporation, 2950 San Ysidro Way, Santa Clara, Calif. As the NAND-gates 98 and 104 there can be employed, for instance, those commercially available from the well known concern Texas Instruments under the code designation Type SN7410. Finally, it is also mentioned that the low-pass filter can be connected forwardly of or following the differentiator.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. An apparatus for producing a binary signal, comprising a differentiator for forming from a deteriorated input signal delivered thereto a second signal which is proportional to the first derivative as a function of time of the deteriorated input signal, threshold value means arranged in circuit with and following said differentiator, said threshold value means comparing the second signal with a positive threshold value and a negative threshold value, said threshold value means forming a binary signal having a first level which remains until the negative threshold value is exceeded at which time a second level of the binary signal is obtained, said threshold value means comprising a first differential amplifier, said first differential amplifier having an inverting input and a non-inverting input, the second signal to be compared appearing at said non-inverting input, means for applying a positive voltage determining the positive threshold value to said inverting input of said differential amplifier, a second differential amplifier having an inverting input and a non-inverting input, the second signal to be compared appearing at said inverting input of said second differential amplifier, means for applying a negative voltage which determines the negative threshold value to the non-inverting input of said second differential amplifier, said threshold value means further including a flip-flop circuit having a first input, a second input and an output, one of the inputs of said flip-flop circuit being connected with the output of said first differential amplifier, the other input of said flip-flop circuit being connected with the output of said second differential amplifier, the converter having an output, the output of said flip-flop being connected with the output of the converter, said flip-flop circuit having a further input, a timing element having an input side and an output side, the input side of said timing element being connected with said output of said flip-flop circuit and the output side of said timing element being connected with said further input of said flip-flop circuit whereby the flip-flop circuit switches to a rest position by a control pulse fed back through said timing element.

2. The apparatus as defined in claim 1, further including an amplifier stage connected forwardly of and in circuit with said differentiator.

3. The apparatus as defined in claim 2, wherein said amplifier stage functions as an impedance converter.

4. The apparatus as defined in claim 1, wherein said differentiator comprises a capacitor and a subsequently connected feedback amplifier stage.

5. The apparatus as defined in claim 1, further including an amplifier stage connected after said differentiator.

6. The apparatus as defined in claim 1, further including a low-pass filter in circuit with said differentiator.

7. The apparatus as defined in claim 6, wherein said low-pass filter is connected forwardly of said differentiator.

8. The apparatus as defined in claim 6, wherein said low-pass filter is connected following said differentiator.

* * * * *